US 6,567,804 B1

(12) United States Patent
Ramasamy et al.

(10) Patent No.: US 6,567,804 B1
(45) Date of Patent: May 20, 2003

(54) SHARED COMPUTATION OF USER-DEFINED METRICS IN AN ON-LINE ANALYTIC PROCESSING SYSTEM

(75) Inventors: Karthikeyan Ramasamy, Madison, WI (US); Prasad Manikarao Deshpande, Madison, WI (US); Amit Shukla, Madison, WI (US); Jeffrey F. Naughton, Madison, WI (US)

(73) Assignee: NCR Corporation, Dayton, OH (US)

( * ) Notice: Subject to any disclaimer, the term of this patent is extended or adjusted under 35 U.S.C. 154(b) by 281 days.

(21) Appl. No.: 09/605,207

(22) Filed: Jun. 27, 2000

(51) Int. Cl.$^7$ .............................................. G06F 17/30
(52) U.S. Cl. .............................................. 707/4; 707/3
(58) Field of Search ............................ 707/2, 3, 4, 100

(56) References Cited

U.S. PATENT DOCUMENTS

| | | | |
|---|---|---|---|
| 5,553,234 A | | 9/1996 | Cotner et al. ............... 714/16 |
| 6,167,396 A | * | 12/2000 | Lokken ........................ 707/3 |
| 6,182,061 B1 | * | 1/2001 | Matsuzawa et al. .......... 707/2 |
| 6,275,818 B1 | * | 8/2001 | Subramanian et al. ........ 707/2 |
| 6,434,544 B1 | * | 8/2002 | Bakalash et al. ............. 707/2 |

OTHER PUBLICATIONS

Goil et al. "A parallel scalable infrastructure for OLAP and data mining", IEEE, IDEAS, 1999, pp. 178–186.*
Jurgens et al. "The R/sub a/*–tree: an improved R*–tree with materialized data for supporting range queries on OLAP–data", IEEE, Database and Expert Systems Applications, 1998, pp. 186–191.*
Kabra et al. "OPT++: an object–oriented implementation for extensible database query optimization", The VLDB Journal, Jan. 1999, pp. 55–78.*
Shukla et al. "Materialized View Selection for Multidimensional Datasets", Proceedings of the 24th VLDB Conference, 1998, pp. 488–499.*
J. Patel et al., Building a Scalable Geo–Spatial DBMS: Technology, Implementation, and Evaluation, SIGMOD 1997, Proceedings ACM SIGMOD International Conference, pp. 1–12.
D. De Witt et al., "Client–Server Paradise," Proceedings of the $20^{th}$ VLDB Conference, Santiago, Chile, 1994 pp. 1–12.
"Opt++: An Object–Oriented Design for Extensible Database Query Optimization," with David J. DeWitt, The VLDB Journal, vol. 8, Issue 1, Jan. 1999 pp. 55–78.
S. Dar et al., "Semantic Data Caching and Replacement," Proc. of the $22^{nd}$ Int. VLDB Conf., 1996 pp. 330–341.
P.M. Desphpande et al., "Caching Multidimensional Queries Using Chunks," Proc. of ACM SIGMOD Int. Conf. on Mgmt. of Data, 1998, 259–270.

(List continued on next page.)

Primary Examiner—John Breene
Assistant Examiner—Cheryl Lewis
(74) Attorney, Agent, or Firm—Gates & Cooper

(57) ABSTRACT

An On-Line Analytic Processing (OLAP) system computes complex expressions and aggregations in queries by re-using and sharing subparts of the expressions and aggregations. A dependency generation phase performed by the OLAP system identifies dependencies among metrics based on the expressions, aggregations, and other metrics used by the metrics. An access plan generation phase performed by the OLAP system generates an access plan based on the identified dependencies, wherein the access plan ensures that expressions, aggregations, and metrics are computed before they are needed, and that required values and intermediate results are passed up a tree structure of the access plan until they are used or consumed by some operator. An operator assignment phase performed by the OLAP system generates operators based on the access plan, and also generates project list expressions, aggregations to be computed in each operator, and input and output tuple types for each operator.

21 Claims, 7 Drawing Sheets

OTHER PUBLICATIONS

A. Shukla et al., "Storage Estimation for Multidimensional Aggregates in the Prescence of Hierarchies," Proc. of the 22$^{nd}$ Int. VLDB Conf., 1996, 522–531.

A. Shukla et al., "Materialized View Selection for Multidimensional Datasets," Proc. of the 24$^{th}$ Int. VLDB conf., 1998, 488–499.

Y. Zhao et al., "An Array–Based Algorithm for Simultaneous Multidimensional Aggregates," Proc. ACM SIGMOD Int. Conf. on Management of Data, 1997, 159–170.

N. Pendse, R. Creeth, The OLAP Report available at http://www.olapreport.com Feb. 26, 2001.

\* cited by examiner

300

SELECT PRODUCT.NAME, AVG(SALES.TOTAL), SUM(SALES.TOTAL)
FROM PRODUCT, SALES
WHERE PRODUCT.NO = SALES.PRODUCTNO

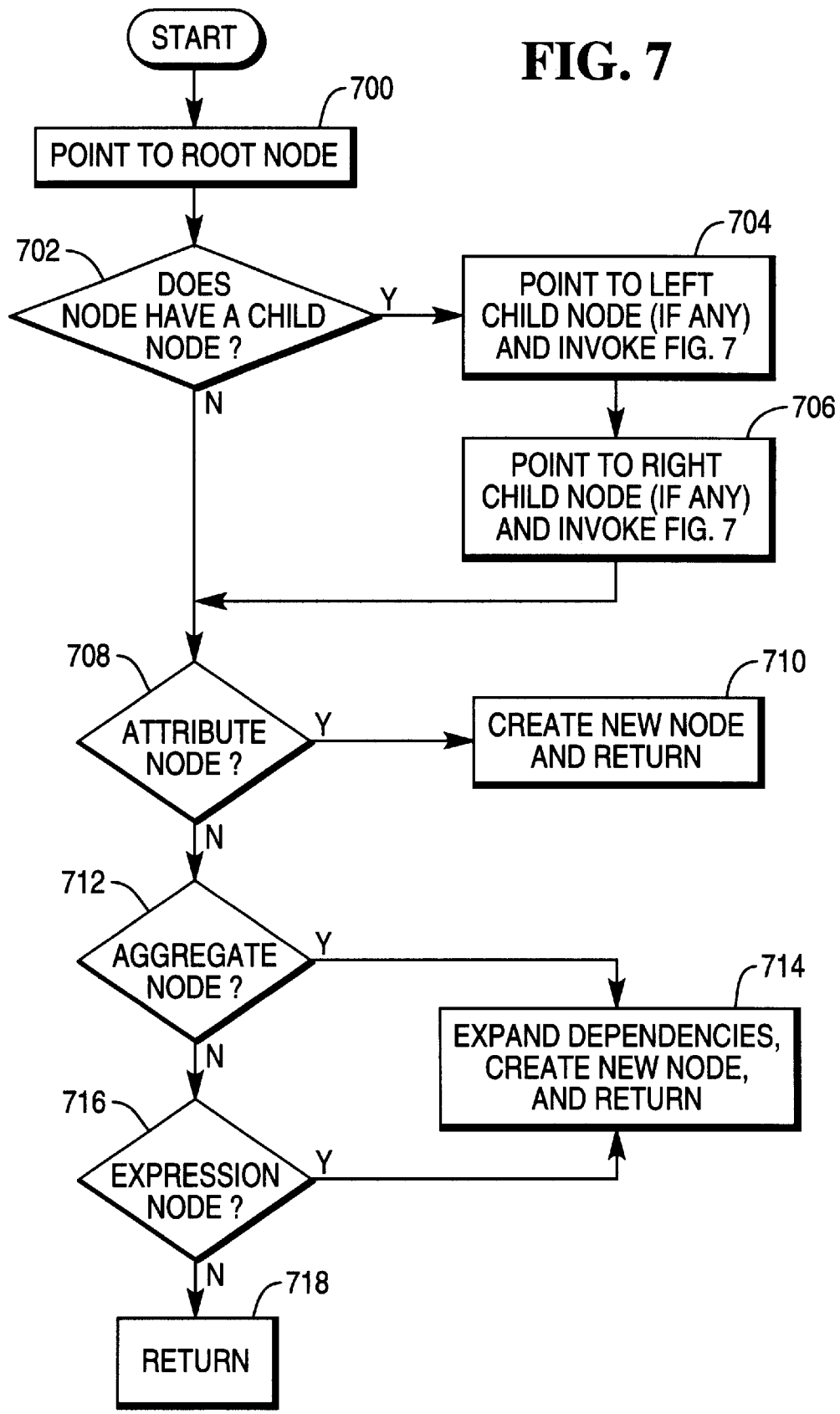

SHARED COMPUTATION OF USER-DEFINED METRICS IN AN ON-LINE ANALYTIC PROCESSING SYSTEM

CROSS REFERENCE TO RELATED APPLICATIONS

This application is related to the following co-pending and commonly assigned patent application, all of which are incorporated by reference herein:

application Ser. No. 09/584,510, entitled "EFFICIENT EXCEPTION HANDLING DURING ACCESS PLAN EXECUTION IN AN ON-LINE ANALYTIC PROCESSING SYSTEM," filed on May 31, 2000, by Karthikeyan Ramasamy, Prasad M. Deshpande, Amit Shukla, and Jeffrey F. Naughton;

application Ser. No. 09/583,633, entitled "SIMULTANEOUS COMPUTATION OF MULTIPLE MOVING AGGREGATES IN A RELATIONAL DATABASE MANAGEMENT SYSTEM," filed on May 31, 2000, by Karthikeyan Ramasamy, Prasad M. Deshpande, Arnit Shukla, and Jeffrey F. Naughton;

application Ser. No. 09/605,202, entitled "METHOD FOR DETERMINING THE COMPUTABILITY OF DATA FOR AN ACTIVE MULTI-DIMENSIONAL CACHE IN A RELATIONAL DATABASE MANAGEMENT SYSTEM," filed on Jun. 27, 2000, by Prasad M. Deshpande, Karthikeyan Ramasamy, Amit Shukla, and Jeffrey F. Naughton;

application Ser. No. 09/583,364, entitled "ACTIVE CACHING FOR MULTI-DIMENSIONAL DATA SETS IN A RELATIONAL DATABASE MANAGEMENT SYSTEM," filed on May 31, 2000, by Prasad M. Deshpande, Iarthikeyan Ramasamy, Amit Shukla, and Jeffrey F. Naughton; and application Ser. No. 09/449,085, entitled "QUERY MONITOR PLAYBACK MECHANISM FOR POST-MORTEM PERFORMANCE ANALYSIS," filed on Nov. 24, 1999, by Karthikeyan Ramasamy, Jie-Bing Yu, and Jun Li.

BACKGROUND OF THE INVENTION

1. Field of the Invention

This invention relates in general to database management systems performed by computers, and in particular, to the shared computation of user-defined metrics for an on-line analytical processing (OLAP) system that uses a relational database management system (RDBMS).

2. Description of Related Art

On-Line Analytical Processing (OLAP) systems provide tools for analysis of multi-dimensional data. Most systems are built using a three-tier architecture, wherein the first or client tier provides a graphical user interface (GUI) or other application, the second or middle tier provides a multi-dimensional view of the data, and the third or server tier comprises a relational database management system (RDBMS) that stores the data.

Most queries in OLAP systems are complex and require the aggregation of large amounts of data. In OLAP systems, expressions and aggregates are often generated by user-defined metrics. Examples of such metrics include running averages of sales over vanous time windows, actual vs. forecast profit margins, and many others. Often, one metric is defined in terms of another, e.g., profit may be defined in terms of sales and various costs. Frequently, a single user query will request multiple metrics, and each metric may have many component sub-metrics. The result is a complex set of expressions and aggregates, which provide the potential for sharing and re-use during evaluation.

A naive way of executing these sets of expressions and aggregations is to consider each expression or aggregation in isolation, evaluating each one separately from all the others. In many cases, this naive approach is very inefficient, because the expressions and aggregations often share a lot of internal structure. Thus, there is a need in the art for improved techniques for evaluating expressions, in order to improve the performance of OLAP systems.

SUMMARY OF THE INVENTION

An On-Line Analytic Processing (OLAP) system computes complex expressions and aggregations in queries by re-using and sharing subparts of the expressions and aggregations. A dependency generation phase performed by the OLAP system identifies dependencies among metrics based on the expressions, aggregations, and other metrics used by the metrics. An access plan generation phase performed by the OLAP system generates an access plan based on the identified dependencies, wherein the access plan ensures that expressions, aggregations, and metrics are computed before they are needed, and that required values and intermediate results are passed up a tree structure of the access plan until they are used or consumed by some operator. An operator assignment phase performed by the OLAP system generates operators based on the access plan, and also generates project list expressions, aggregations to be computed in each operator, and input and output tuple types for each operator.

BRIEF DESCRIPTION OF THE DRAWINGS

Referring now to the drawings in which like reference numbers represent corresponding parts throughout:

FIG. 7 is a flowchart that illustrates the logic performed during dependency generation according to the preferred embodiment of the present invention;

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

OVERVIEW

The present invention computes complex expressions and aggregations in queries by re-using and sharing subparts of the expressions and aggregations. The solution can be categorized in three phases:

Dependency Generation—This phase identifies dependencies among metrics based on the expressions, aggregations, and other metrics used by the metrics.

Plan Tree Generation—This phase generates an access plan based on the identified dependencies. The access plan ensures that expressions, aggregations, and metrics are computed before they are needed, and that required values and intermediate results are passed up an tree structure of the access plan until they are used or consumed by some operator.

Operator Assignment—In this phase, operators are generated based on the access plan. In addition, this phase generates project list expressions, aggregations to be computed in each operator, and input and output tuple types for each operator.

Each of these phases is described in more detail below.

HARDWARE AND SOFTWARE ENVIRONMENT

Figure 1:
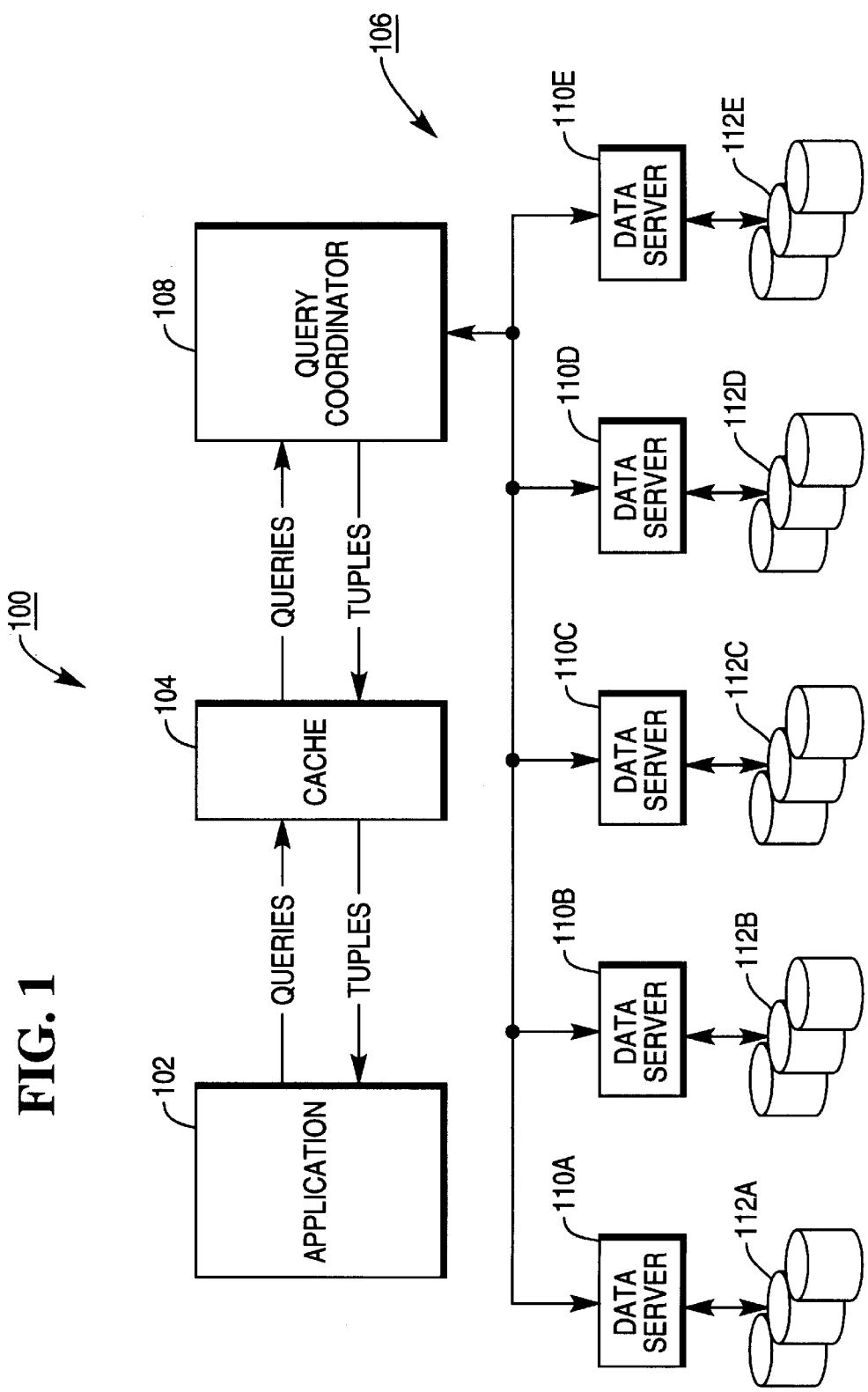
FIG. 1 illustrates an exemplary hardware and software environment that could be used with the present invention.

FIG. 1 illustrates an exemplary hardware and software environment that could be used with the present invention. In the exemplary environment, a computer system 100 implements an OLAP (On-Line Analytic Processing) system in a three-tier client-server architecture, wherein the first or client tier provides a graphical user interface (GUI) or other application 102, the second or middle tier provides a cache 104 for storing multi-dimensional data, and the third or server tier comprises a relational database management system (RDBMS) 106 that generates the multi-dimensional data from tables stored in a relational database.

In the preferred embodiment, the RDBMS 106 includes a query coordinator 108 and one or more data servers 110A–110E storing the relational database in one or more data storage devices 112A–112E. The query coordinator 108 and data servers 110 may be implemented in separate machines, or may be implemented as separate or related processes in a single machine. The RDBMS 106 used in the preferred embodiment comprises the Teradata® RDBMS sold by NCR Corporation, the assignee of the present invention.

In the preferred embodiment, the system 100 may use any number of different parallelism mechanisms. Tables within the relational database may be fully partitioned across all data storage devices 112 in the system 100 using hash, range, value, or other partitioning methods. Generally, the data servers 110 perform operations against the relational database in a parallel manner as well Generally, the application 102, cache 104, RDBMS 106, query coordinator 108, and/or data servers 110A–110E comprise logic and/or data tangibly embodied in and/or accessible from a device, media, carrier, or signal, such as RAM, ROM, one or more of the data storage devices 112A–112E, and/or a remote system or device communicating with the computer system 100 via one or more data communications devices.

However, those skilled in the art will recognize that the exemplary environment illustrated in FIG. 1 is not intended to limit the present invention. Indeed, those skilled in the art will recognize that other alternative environments may be used without departing from the scope of the present invention. In addition, it should be understood that the present invention may also apply to components other than those disclosed herein.

EXECUTION OF SQL QUERIES

Figures 2, 3:
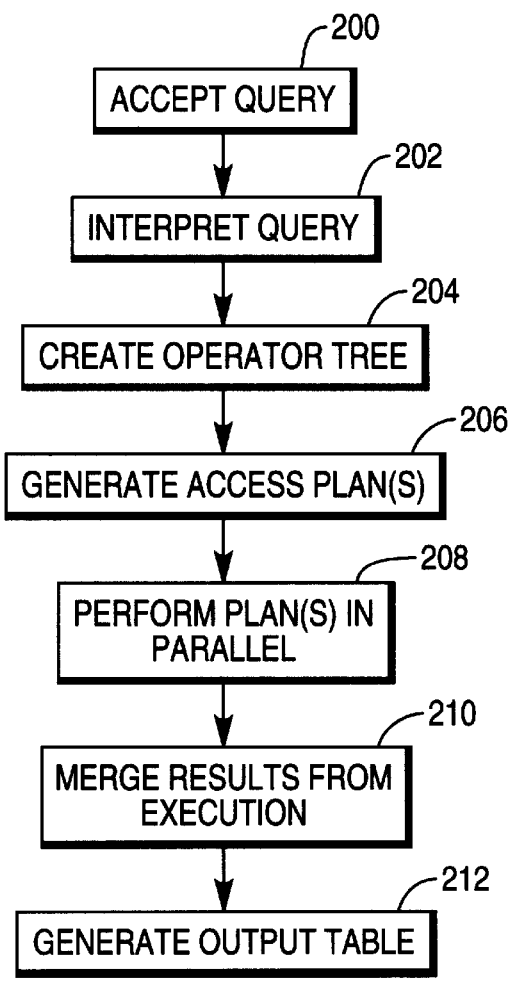
FIG. 2 is a flowchart that illustrates the general processing of queries according to the preferred embodiment of the present invention.
FIGS. 3, 4, and 5 present an example SQL query, an associated operator tree, and an associated access plan.

FIG. 2 is a flow chart illustrating the steps necessary for the interpretation and execution of queries or other user interactions, either in a batch environment or in an interactive environment, according to the preferred embodiment of the present invention.

Block 200 represents a query being accepted by the query coordinator 108.

Block 202 represents the query coordinator 108 transforming the query into an operator tree.

Block 204 represents the query coordinator 108 generating one or more access plans from the operator tree.

Block 206 represents the query coordinator 108 parallelizing the access plans, and then transmitting the access plans to their assigned data servers 110.

Block 208 represents the data servers 110 performing the required data manipulation associated with the access plans received from the query coordinator 108, wherein the access plans are performed in parallel by the data servers 110.

Block 210 represents the query coordinator 108 then merging the results received from the data servers 110, and optionally storing the results into the data cache 104.

Block 212 represents the output or result table being generated from the merged results, so that the responses can ultimately be delivered to the application 102.

OPERATOR TREES AND ACCESS PLANS

Figure 4:
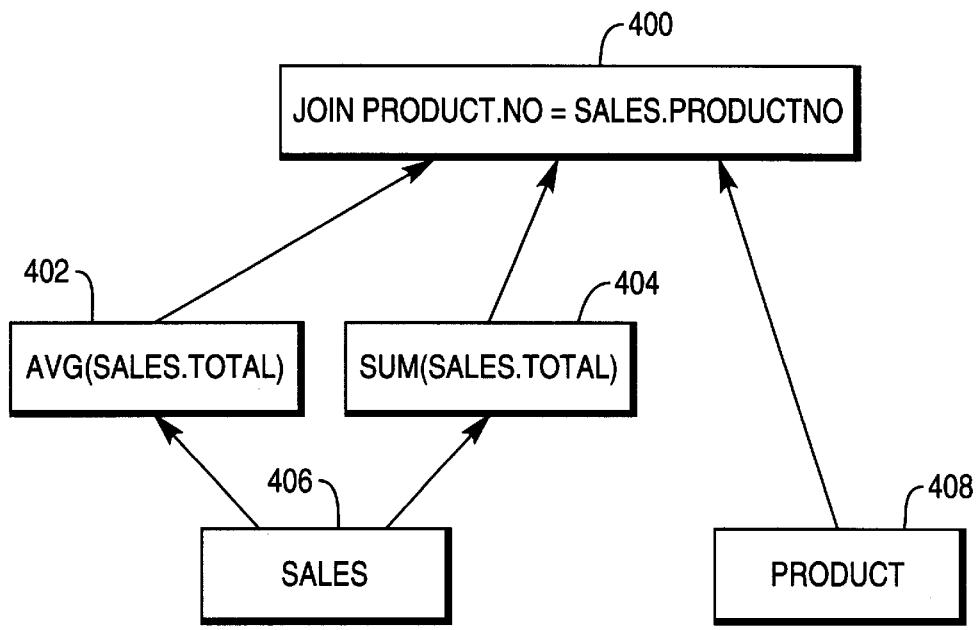
Figure 5:
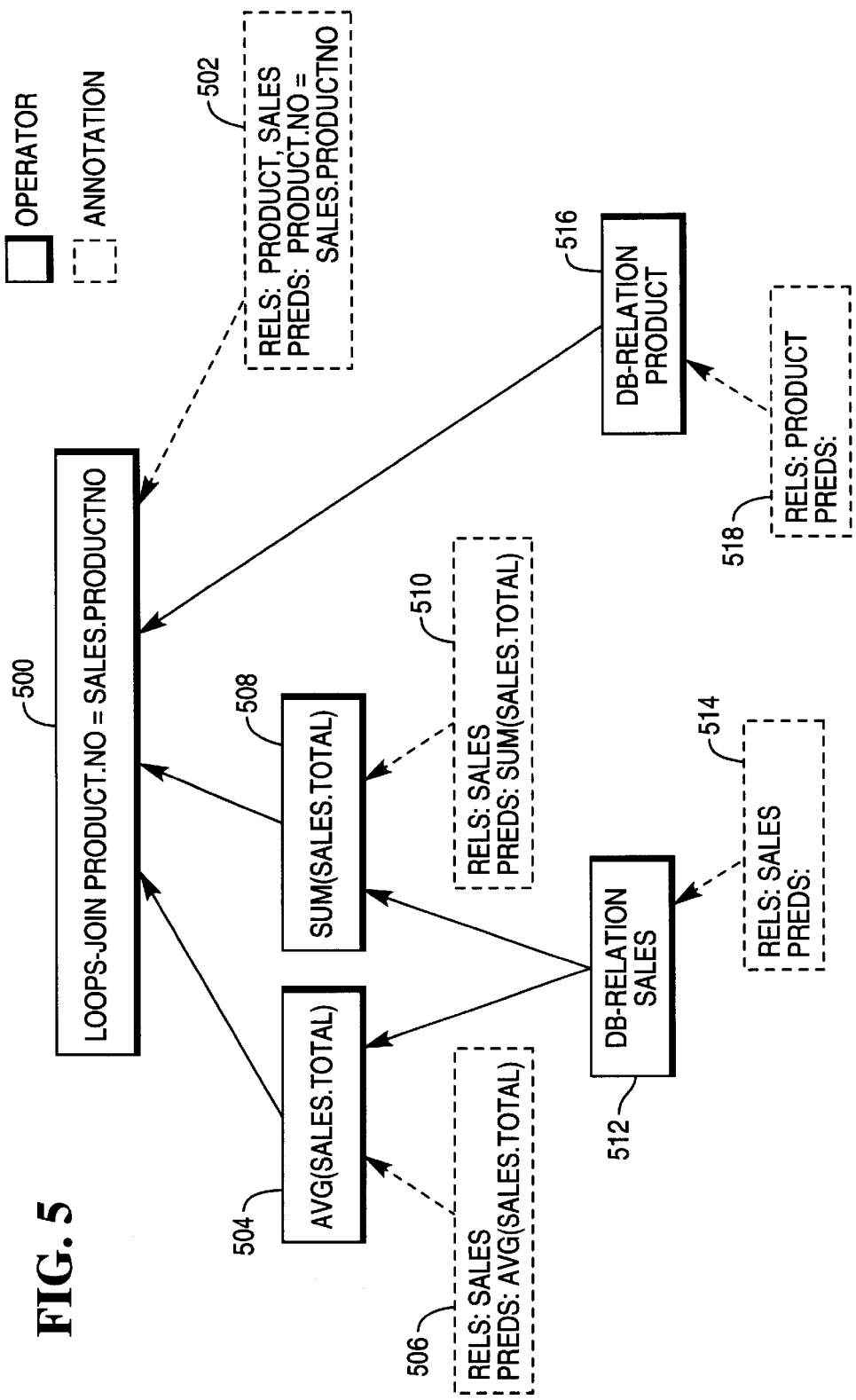

FIGS. 3, 4, and 5 present an example SQL query, an associated operator tree, and an associated access plan. The SQL query of FIG. 3 is converted from its textual form to one or more equivalent operator trees as shown in FIG. 4, and each of the operator trees can be represented as one or more access plans as shown in FIG. 5. During the query optimization process, the query coordinator 108 must generate various operator trees that represent the SQL query (or parts of it), generate the various access plans corresponding to each operator tree, and compute/estimate various properties of the operator trees and access plans (for example, cardinality of the output relation, estimated execution cost, etc.) in order to select an optimal access plan.

FIG. 4 illustrates an operator tree generated from the query shown in FIG. 3, wherein the operator tree includes nodes 400, 402, 404, 406, and 408. The two DB-RELATION nodes 406 and 408 represent the two relations in the FROM clause of the query, i.e., "SALES" and "PRODUCT". The AVG node 402 and SUM node 404 represent aggregate functions, i.e., average and sum, on the "SALES" relation, and the JOIN node 400 represents the "PRODUCT" relation being joined to the result of the moving average and moving sum functions on the "SALES" relation.

In the dependency generation phase, the operator tree is traversed using a depth-first traversal order. Specifically, the leaf level nodes must be computed first before the intermediate nodes are computed. The dependency graph captures information about the order of computation.

The dependency generation phase identifies dependencies among the metrics, based on the expressions, aggregations, and other metrics used. Cached metric definitions are used to expand the metrics used in the query, wherein the expanded metric definitions describe the expressions and aggregations required to compute the metric.

For every attribute node encountered, a new node is created in the dependency graph. For aggregations and expressions, the dependencies of the children are expanded and a new node is created in the dependency graph that links the dependencies of the children. The result is a data structure, the annotated access plan, that describes all the dependencies between all of the subparts of all of the metrics used in the query.

FIG. 5 illustrates an annotated access plan generated from the operator tree shown in FIG. 4, wherein the annotated access plan includes nodes 500, 502, 504, 506, 508, 510, 512, 514, 516 and 518. The access plan specifies the operators to be executed, the expressions and predicates to be evaluated, and the aggregations to be performed. Furthermore, the access plan expresses the dependencies between operators by organizing the nodes 500, 504, 508, 512, and 516 representing the operators in the form of a tree.

The annotations 502, 506, 510, 514 and 518 in the access plan further describe the expressions and aggregations required for the access plan. The query coordinator 108 evaluates the access plan using a "tree of operators" approach. In this approach, the operator nodes 500, 504, 508, 512 and 516 accept streams of values as inputs, operate on these values, and then produce modified streams of values as outputs. The edges in the access plan describe the flow of the value streams through the access plan: (1) node 516 produces values for node 500; (2) node 512 produces values for nodes 504 and 508; (3) node 508 produces values for node 500; and (4) node 504 produces values for node 500.

The access plan generation phase generates the access plan based on the extracted dependencies. The access plan thus ensures that the expressions, aggregations and metrics are computed before they are needed, and that the required values and intermediate results are passed up the tree structure of the access plan until used or consumed by an operator.

In order to generate the access plan from the dependency graph of the operator tree, the query output is scanned by the query coordinator 108, thereby generating an "output list" of terms to be returned to the user. The output list is divided into terminals and non-terminals. A terminal is any data element that does not have to be computed, because it is stored in the base data accessed by the RDBMS. By contrast, non-terminals need to be computed by operating on base data.

The output list is then scanned by the query coordinator 108 and a new list is created. For each terminal encountered in the output list, the query coordinator 108 must determine whether the equivalent entry of the terminal is in the new list. If not, then the query coordinator 108 creates an entry, marks it as a terminal, and inserts it into the new list. These entries are called pass-through nodes, because they are passed through a node without any modification. Pass-through nodes are used merely to ensure that values needed at the final output are actually passed up the tree structure of the access plan, so that they arrive at the topmost node for output to the client application 102.

If the terminal already exists in the new list, the query coordinator 108 uses this existing entry, so that sharing is possible. After ensuring that a terminal in the output list has an equivalent in the new list, the query coordinator 108 creates a link between the terminal in the output list and its corresponding entry in the new list. This link specifies that the terminal in the output list derive its value from the entry in the new list.

Each non-terminal in the output list is expanded (using the dependency graph) into a set of terminals and non-terminals in the new list. The expanded terminals and non-terminals are checked before they are actually inserted in the new list, so that they can be shared. Next, links are added by the query coordinator 108, so that the original non-terminal points to the expanded terminals and non-terminals. This process is repeated again and another new list is generated. The whole procedure is terminated when the new list contains all terminals.

In the operator assignment phase, operators are assigned for each list. The terminals and non-terminals in each list are converted into projection expressions and added to the evaluation list of the operator. Each operator requires an input and output tuple type, so that it knows how to interpret the input tuples and generate appropriate output tuples. For each list, the corresponding tuple type is the type of its terminals and non-terminals.

The access plan is executed by making an instance of the appropriate operator for each node in the tree, with each of these operators executing in an independent thread, thereby generating an answer to the query while maximizing the sharing and reuse of intermediate aggregations and expressions. Streams connect these instances and move data from one operator to another operator (in a pipelined fashion). Finally, the results are pipelined to the consumer (e.g., application program 102 and/or cache 104) in tandem with the execution of the operators. All operators operate in a "push" fashion, in which data flows upwards to operators higher in the access plan.

LOGIC OF THE PREFERRED EMBODIMENT

Figure 6:
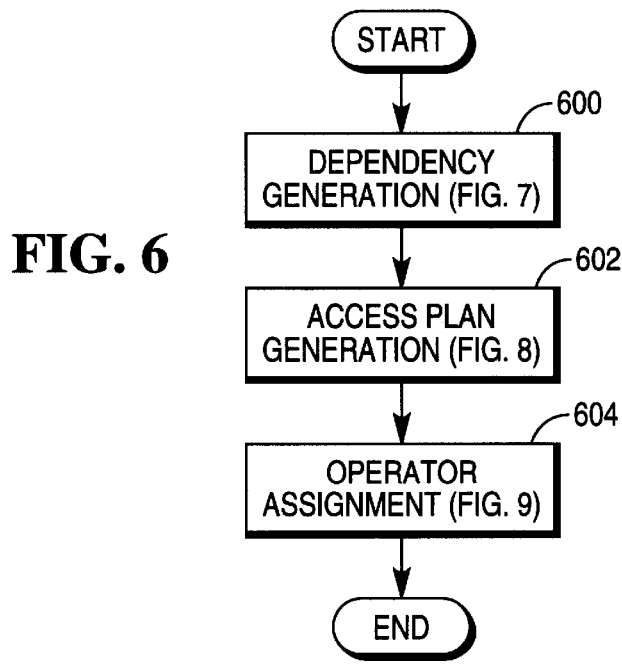
FIG. 6 is a flowchart that illustrates the logic performed according to the preferred embodiment of the present invention.

FIG. 6 illustrates the logic of the preferred embodiment of the present invention, and specifically, the logic performed in Blocks 202, 204, and 206 of FIG. 2 by the query coordinator 108.

Block 600 represents the query coordinator 108 performing the dependency generation phase (see FIG. 7), i.e., identifying dependencies among metrics based on the expressions, aggregations, and other metrics used by the metrics.

Block 602 represents the query coordinator 108 performing the access plan generation phase (see FIG. 8) based on the identified dependencies. The access plan ensures that the expressions, aggregations, and metrics are computed before they are needed, and that the required values and intermediate results are passed up an operator tree until they are used or consumed by some operator.

Block 604 represents the query coordinator 108 performing the operator assignment phase (see FIG. 9), which phase generates project list expressions, aggregations to be computed in each operator, and input and output tuple types for each operator.

Thereafter, the logic terminates.

FIG. 7 illustrates the logic involved in the dependency generation phase according to the preferred embodiment of the present invention.

Block 700 represents the query coordinator 108 pointing to the current root node (operator) of the access plan.

Block 702 is a decision block that represents the query coordinator 108 determining whether the root node has either a left and/or right child node. If so, control transfers to Block 704; otherwise, control transfers to Block 708.

Block 704 represents the query coordinator 108 traversing the access plan from the current node to point to its left child node (if any) as a current root node, and if a left child node exists, then recursively invoking the logic of FIG. 7.

Block 706 represents the query coordinator 108 traversing the access plan from the current node to point to its right child node (if any) as a current root node, and if a right child node exists, then recursively invoking the logic of FIG. 7.

Block 708 is a decision block that represents the query coordinator 108 determining whether the root node is an attribute node. If so, control transfers to Block 710; otherwise, control transfers to Block 712.

Block 710 represents the query coordinator 108 creating a new node in the dependency graph and then returning to the calling point.

Block 712 is a decision block that represents the query coordinator 108 determining whether the root node is an aggregate node. If so, control transfers to Block 714; otherwise, control transfers to Block 716.

Block 714 represents the query coordinator 108 expanding the dependencies of the children nodes, creating a new node in the dependency graph that links the dependencies of the children nodes, and then returning to the calling point.

Block 716 is a decision block that represents the query coordinator 108 determining whether the root node is an aggregate node. If so, control transfers to Block 714; otherwise, control transfers to Block 718.

Block 718 represents the query coordinator 108 returning to the calling point.

Figure 8:
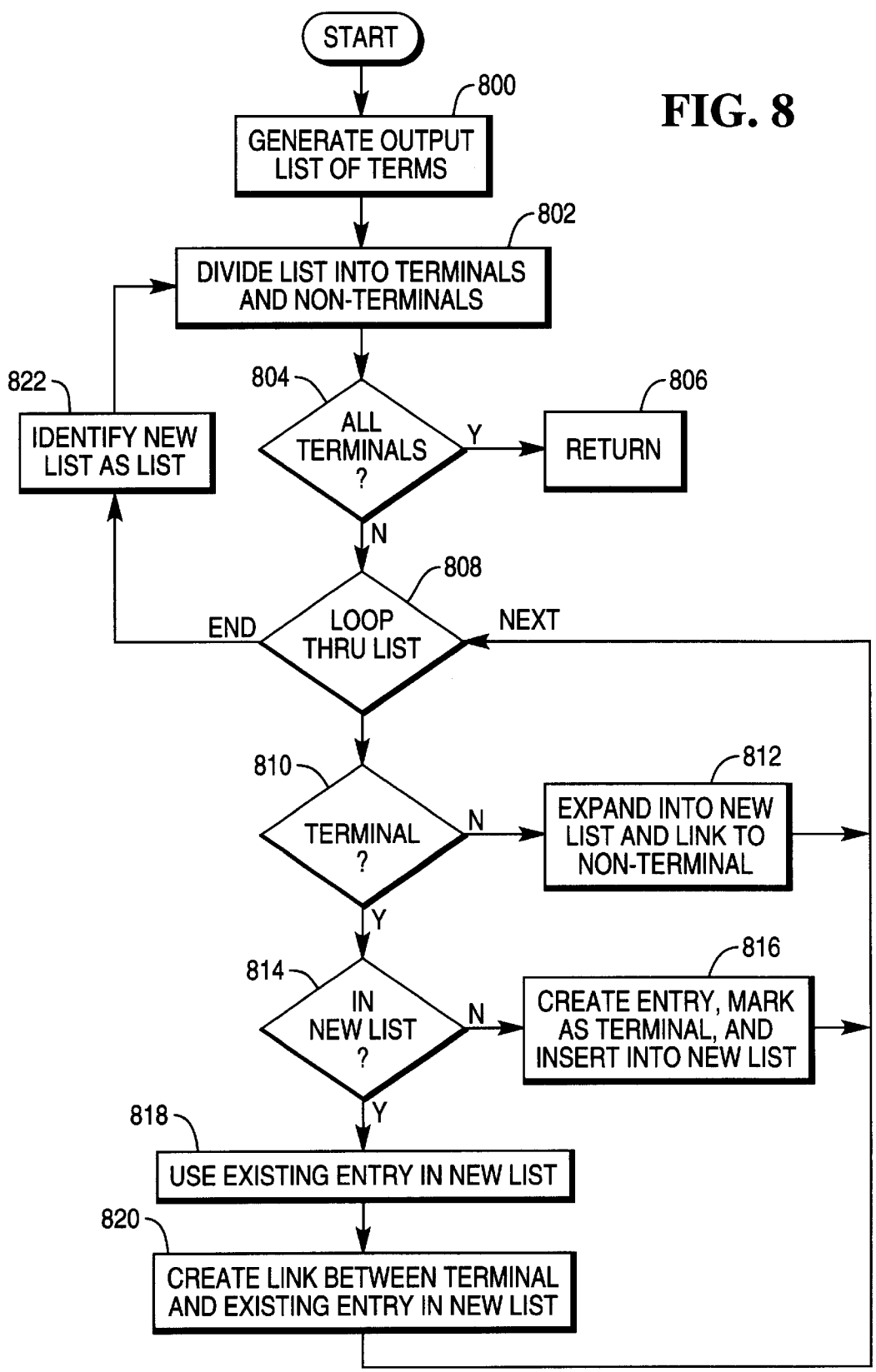
FIG. 8 is a flowchart that illustrates the logic performed during access plan generation according to the preferred embodiment of the present invention.

FIG. 8 illustrates the logic involved in the access plan generation phase, which generates the access plan based on the extracted dependencies, according to the preferred embodiment of the present invention. The access plan thus ensures that the expressions, aggregations and metrics are computed before they are needed, and that the required values and intermediate results are passed up the tree structure of the access plan until used or consumed by an operator.

Block 800 represents the query coordinator 108 scanning the query output to generate an "output list" of terms to be returned to the user.

Block 802 represents the query coordinator 108 dividing the output list into terminals and non-terminals. A terminal is any data element that does not have to be computed, because it is stored in the base data accessed by the RDBMS. By contrast, non-terminals need to be computed by operating on base data.

Block 804 is a decision block that represents the query coordinator 108 determining whether the list has all terminals. If so, control transfers to Block 806, which returns to the calling point.

Block 808 is a decision block that represents the query coordinator 108 performing a loop to scan every term on the list, in order to create a new list. For each iteration, control transfers to Block 810; upon completion, control transfers to Block 822.

Block 810 is a decision block that represents the query coordinator 108 determining whether the entry on the output list is a terminal. If so, control transfers to Block 812; otherwise, control transfers back to Block 814.

Block 812 represents the query coordinator 108 expanding the non-terminal (using the dependency graph) into a set of terminals and non-terminals in the new list. The expanded terminals and non-terminals are checked before they are actually inserted in the new list, so that they can be shared. In addition, links are added by the query coordinator 108, so that the original non-terminal points to the expanded terminals and non-terminals.

Block 814 is a decision block that represents the query coordinator 108 determining whether the terminal is in the new list. If not, control transfers to Block 816; otherwise, control transfers to Block 818.

Block 816 represents the query coordinator 108 creating an entry, marking it as a terminal, and inserting it into the new list. These entries are called pass-through nodes, because they are passed through a node without any modification. Pass-through nodes are used merely to ensure that values needed at the final output are actually passed up the tree structure of the access plan, so that they arrive at the topmost node for output to the client application 102.

Block 818 represents the query coordinator 108 using an existing entry when the terminal already exists in the new list, so that sharing is possible.

Block 820 represents the query coordinator 108 creating a link between the terminal in the output list and its corresponding entry in the new list. This link specifies that the terminal in the output list derives its value from the entry in the new list.

Block 822 represents the query coordinator 108 identifying the new list as the current list, and then transferring control to Block 802, so that the process can be repeated and another new list generated. Note that the process is terminated when the new list contains all terminals at Block 804.

Figure 9:
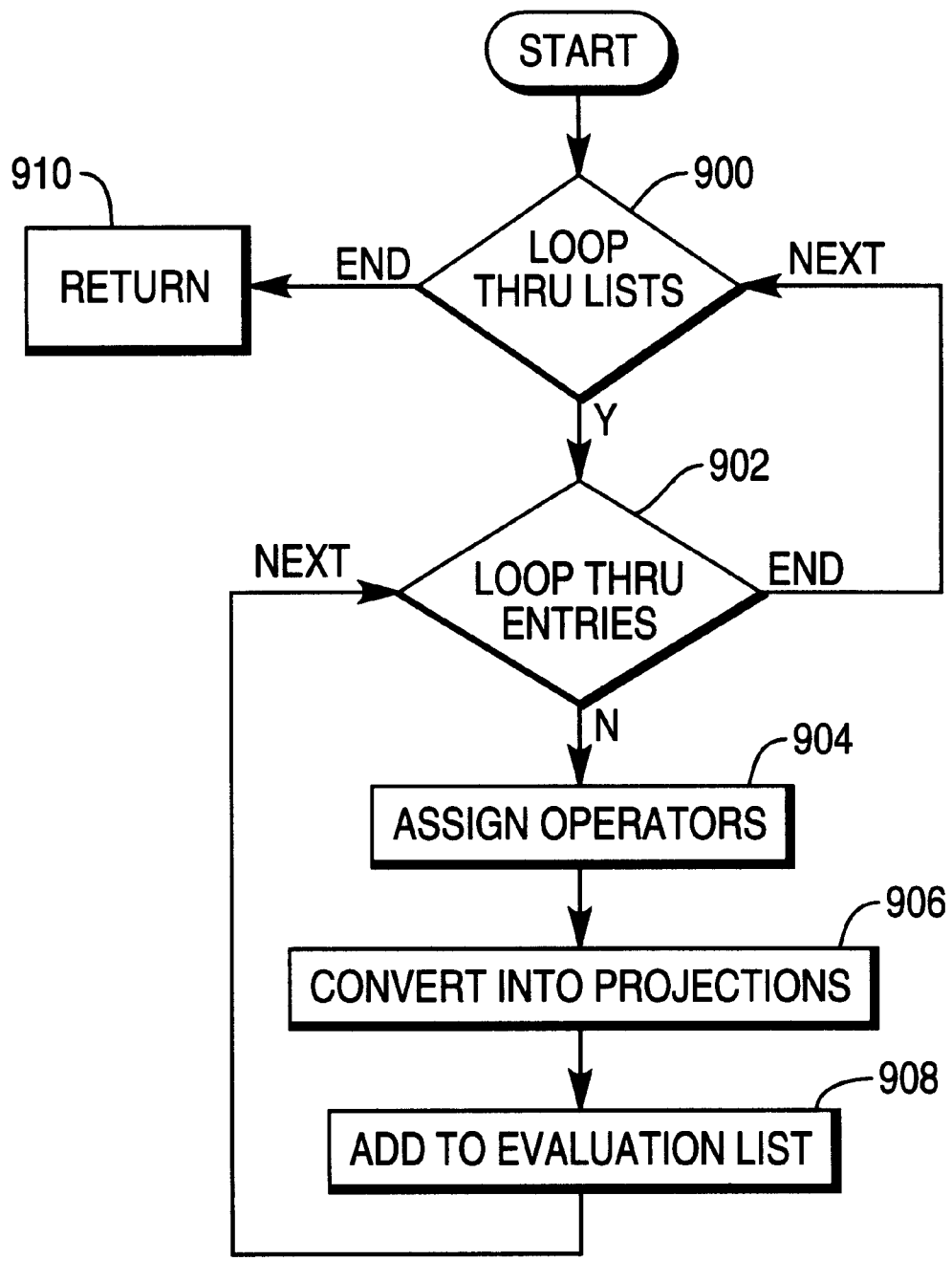
FIG. 9 is a flowchart that illustrates the logic performed during access plan generation according to the preferred embodiment of the present invention.

FIG. 9 illustrates the logic involved in the operator assignment phase, wherein operators are assigned for each list. The terminals and non-terminals in each list are converted into projection expressions and added to the evaluation list of the operator. Each operator requires an input and output tuple type, so that it knows how to interpret the input tuples and generate appropriate output tuples. For each list, the corresponding tuple type is the type of its terminals and non-terminals.

Block 900 is a decision block that represents the query coordinator 108 performing a loop to scan every list. For each iteration, control transfers to Block 902; upon completion, control transfers to Block 910.

Block 902 is a decision block that represents the query coordinator 108 performing a loop to scan entry on the current list. For each iteration, control transfers to Block 904; upon completion, control transfers to Block 900.

Block 904 represents the query coordinator 108 assigning operators for each list.

Block 906 represents the query coordinator 108 converting terminals and non-terminals in each list into projection expressions.

Block 908 represents the query coordinator 108 adding the projection expressions to the evaluation list of the operator.

Block 910 represents the query coordinator 108 returning to the calling point.

CONCLUSION

This concludes the description of the preferred embodiment of the invention. The following paragraphs describe some alternative embodiments for accomplishing the same invention.

In one alternative embodiment, any type of computer could be used to implement the present invention. In addition, any database management system, decision support system, on-line analytic processing system, or other computer program that performs similar functions could be used with the present invention.

In summary, the present invention discloses an On-Line Analytic Processing (OLAP) system that computes complex expressions and aggregations in queries by re-using and sharing subparts of the expressions and aggregations. A dependency generation phase performed by the OLAP system identifies dependencies among metrics based on the expressions, aggregations, and other metrics used by the metrics. An access plan generation phase performed by the OLAP system generates an access plan based on the identified dependencies, wherein the access plan ensures that expressions, aggregations, and metrics are computed before they are needed, and that required values and intermediate results are passed up a tree structure of the access plan until they are used or consumed by some operator. An operator assignment phase performed by the OLAP system generates operators based on the access plan, and also generates project list expressions, aggregations to be computed in each operator, and input and output tuple types for each operator.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for analyzing a query in an on-line analytical processing (OLAP) system, comprising:

(a) converting the query into an operator tree;
    (b) generating a dependency graph to identify shared computations of user-defined metrics in the query using a depth-first traversal of the operator tree; and
    (c) generating an access plan from the operator tree using the dependency graph.

2. The method of claim 1, wherein the generating step (b) comprises identifying dependencies among metrics based on expressions, aggregations, and other metrics used by the metrics.

3. The method of claim 2, wherein the generating step (c) comprises generating the access plan based on the identified dependencies.

4. The method of claim 1, further comprising assigning operators based on the generated access plan.

5. The method of claim 4, wherein the access plan ensures that expressions, aggregations, and metrics are computed before they are needed, and that required values and intermediate results are passed up a tree structure of the access plan until they are used or consumed by an operator.

6. The method of claim 4, wherein the assigning step comprises generating project list expressions for each operator, aggregations to be computed in each operator, and input and output tuple types for each operator.

7. The method of claim 1, further comprising executing the access plan, further comprising computing expressions and aggregations by re-using and sharing subparts of the expressions and aggregations.

8. An on-line analytical processing (OLAP) system that analyzes a query, comprising:

(a) a computer system;
    (b) logic, performed by the computer system, for:

(1) converting the query into an operator tree;
        (2) generating a dependency graph to identify shared computations of user-defined metrics in the query using a depth-first traversal of the operator tree; and
        (3) generating an access plan from the operator tree using the dependency graph.

9. The system of claim 8, wherein the logic for generating (2) comprises logic for identifying dependencies among metrics based on expressions, aggregations, and other metrics used by the metrics.

10. The system of claim 9, wherein the logic for generating (3) comprises logic for generating the access plan based on the identified dependencies.

11. The system of claim 8, further comprising logic for assigning operators based on the generated access plan.

12. The system of claim 11, wherein the access plan ensures that expressions, aggregations, and metrics are computed before they are needed, and that required values and intermediate results are passed up a tree structure of the access plan until they are used or consumed by an operator.

13. The system of claim 11, wherein the logic for assigning comprises logic for generating project list expressions for each operator, aggregations to be computed in each operator, and input and output tuple types for each operator.

14. The system of claim 8, further comprising logic for executing the access plan, further comprising logic for computing expressions and aggregations by re-using and sharing subparts of the expressions and aggregations.

15. An article of manufacture embodying logic for analyzing a query in an on-line analytical processing (OLAP) system, the logic comprising:

(a) converting the query into an operator tree;
    (b) generating a dependency graph to identify shared computations of user-defined metrics in the query using a depth-first traversal of the operator tree; and
    (c) generating an access plan from the operator tree using the dependency graph.

16. The article of manufacture of claim 15, wherein the generating step (b) comprises identifying dependencies among metrics based on expressions, aggregations, and other metrics used by the metrics.

17. The article of manufacture of claim 16, wherein the generating step (c) comprises generating the access plan based on the identified dependencies.

18. The article of manufacture of claim 15, further comprising assigning operators based on the generated access plan.

19. The article of manufacture of claim 18, wherein the access plan ensures that expressions, aggregations, and metrics are computed before they are needed, and that required values and intermediate results are passed up a tree structure of the access plan until they are used or consumed by an operator.

20. The article of manufacture of claim 18, wherein the assigning step comprises generating project list expressions for each operator, aggregations to be computed in each operator, and input and output tuple types for each operator.

21. The article of manufacture of claim 15, further comprising executing the access plan, further comprising computing expressions and aggregations by re-using and sharing subparts of the expressions and aggregations.

* * * * *